United States Patent
Bosker et al.

(10) Patent No.: US 7,351,019 B2
(45) Date of Patent: Apr. 1, 2008

(54) CLAMPING MECHANISM FOR AN ELONGATED WORKPIECE

(75) Inventors: John A. Bosker, South Bend, IN (US); Stephen A. Johnson, South Bend, IN (US)

(73) Assignee: Custom Machine Manufacturing, LLC., South Bend, IN (US)

( * ) Notice: Subject to any disclaimer, the term of this patent is extended or adjusted under 35 U.S.C. 154(b) by 490 days.

(21) Appl. No.: 10/928,766

(22) Filed: Aug. 27, 2004

(65) Prior Publication Data
US 2006/0045642 A1 Mar. 2, 2006

(51) Int. Cl.
*B23C 3/00* (2006.01)
(52) U.S. Cl. .................... 409/197; 408/103; 409/225; 198/345.1; 269/228; 269/237
(58) Field of Classification Search ............... 409/163, 409/225, 197, 227; 408/50, 103, 108; 83/409, 83/452, 461, 459; 269/237–239, 228, 910; 198/345.1; 144/250.12, 253.6
See application file for complete search history.

(56) References Cited
U.S. PATENT DOCUMENTS

| | | | | |
|---|---|---|---|---|
| 3,841,462 A | * | 10/1974 | Schmidt | 198/345.1 |
| 3,954,044 A | * | 5/1976 | Ridgway | 409/139 |
| 4,149,819 A | * | 4/1979 | Kitagawa | 408/50 |
| 4,179,230 A | * | 12/1979 | Kitagawa | 408/39 |
| 4,198,181 A | * | 4/1980 | Smelser | 408/39 |
| 5,353,910 A | * | 10/1994 | Harris et al. | 198/345.1 |
| 6,231,036 B1 | | 5/2001 | Johnson et al. | |
| 6,648,120 B2 | * | 11/2003 | Konieczny | 198/345.1 |
| 7,111,720 B1 | * | 9/2006 | Harris | 198/345.1 |

* cited by examiner

*Primary Examiner*—Daniel W. Howell
(74) *Attorney, Agent, or Firm*—R. Tracy Crump

(57) ABSTRACT

The clamping mechanism is used in an automated tooling machine to secure and hold an elongated workpiece for processing. The machine includes a frame, automated router assembly and a conveyer table. The workpiece is supported on the conveyer table and secured by the clamping mechanism between a fixed clamp rail and a moving clamp rail. The moving clamp rail is supported above the conveyer table by a plurality of arms and articulated by two linkage members pivotally connecting the arms to the frame beneath the conveyer table. The linkage members of the clamping mechanism allows the moving clamp rail to traverse laterally over the conveyer table at substantially the same height above the conveyer table as the height of the fixed clamping rail.

20 Claims, 9 Drawing Sheets

CLAMPING MECHANISM FOR AN ELONGATED WORKPIECE

This invention relates to tooling machines for cutting, milling, or routing an elongated workpiece, and in particular, a clamping mechanism for holding and securing the workpiece within the tooling machine.

BACKGROUND OF THE INVENTION

Polyvinyl tubing has been increasingly used for fencing and outdoor decks. Various automated tooling machines, such as saws, routers, drills and milling machines, have been developed to produce PVC tubing for such fencing and deck applications. Conventional tooling machines typically use computerized numerical controls (CNC) or other automated process controls to consistently and accurately process each workpiece. While CNC process controls used by conventional tooling machines greatly improve the speed and quality of the tooling process, it is critical that each workpiece be consistently and securely supported and aligned within automated tooling machines. Conventional automated tooling machines require a clamping mechanism that secures the workpiece in a predetermined position and location as the piece is processed. This "centering" of the workpiece within the tooling machine is essential for consistent tooling processes using conventional automated tooling machinery.

Heretofore, conventional clamping mechanisms have employed complicated rails and cams that are difficult to align and maintain. These clamping mechanisms often include two parallel clamping members that move together in unison to engage a workpiece. The moving clamp rails not only secure the workpiece, but center and align it within the tooling machine. Conventional clamping mechanisms are subject to mechanical wear and play, which can effect the accurate and proper centering and alignment of the workpiece within the tooling machine. Mechanical wear produces play in the clamping rails, which requires that the tooling machine be constantly adjusted and calibrated to ensure proper workpiece alignment and consistent processing over long production runs. A simple but reliable clamping mechanism that will compensate for any mechanical wear or play in the mechanism would be a significant improvement over existing clamping mechanisms in manufacturing process equipment.

SUMMARY OF THE INVENTION

The present invention seeks to provide an improved clamping mechanism used in automated tooling machines to secure and hold an elongated workpiece for processing. According to the present invention, the workpiece is supported on a conveyer table and secured between a fixed clamp rail and a moving clamp rail. The moving clamp rail is supported above the conveyer table by a plurality of arms and articulated by two linkage members pivotally connecting the arms to the frame beneath the conveyer table. The linkage members of the clamping mechanism allow the moving clamp rail to traverse laterally over the conveyer table at substantially the same height above the conveyer table as the height of the fixed clamping rail. Accordingly, the present invention can automatically compensate for any mechanical wear or play in the linkage and ensure that the workpiece is properly centered and aligned atop the conveyer table. The fixed rail of the clamping mechanism provides a fixed reference location from which an automated process controller can calibrate and orient the operation of both the router assembly and the clamping mechanism. By referencing the operation of the router assembly and clamping mechanism to the location of the fixed clamp rail, the effect of mechanical wear and play is eliminated. The present invention also seeks to incorporate the conveyer table and clamping mechanism as an integrated unit with both the conveyer table and the clamping mechanism mounted to the machine frame by shared mounting brackets.

Theses and other advantages and improvements of the present invention will become apparent from the following description of an embodiment of the invention with reference to the accompanying drawings.

BRIEF DESCRIPTION OF THE DRAWINGS

An embodiment of the present invention is illustrated in the drawings, in which.

DESCRIPTION OF THE PREFERRED EMBODIMENT

Figure 1:
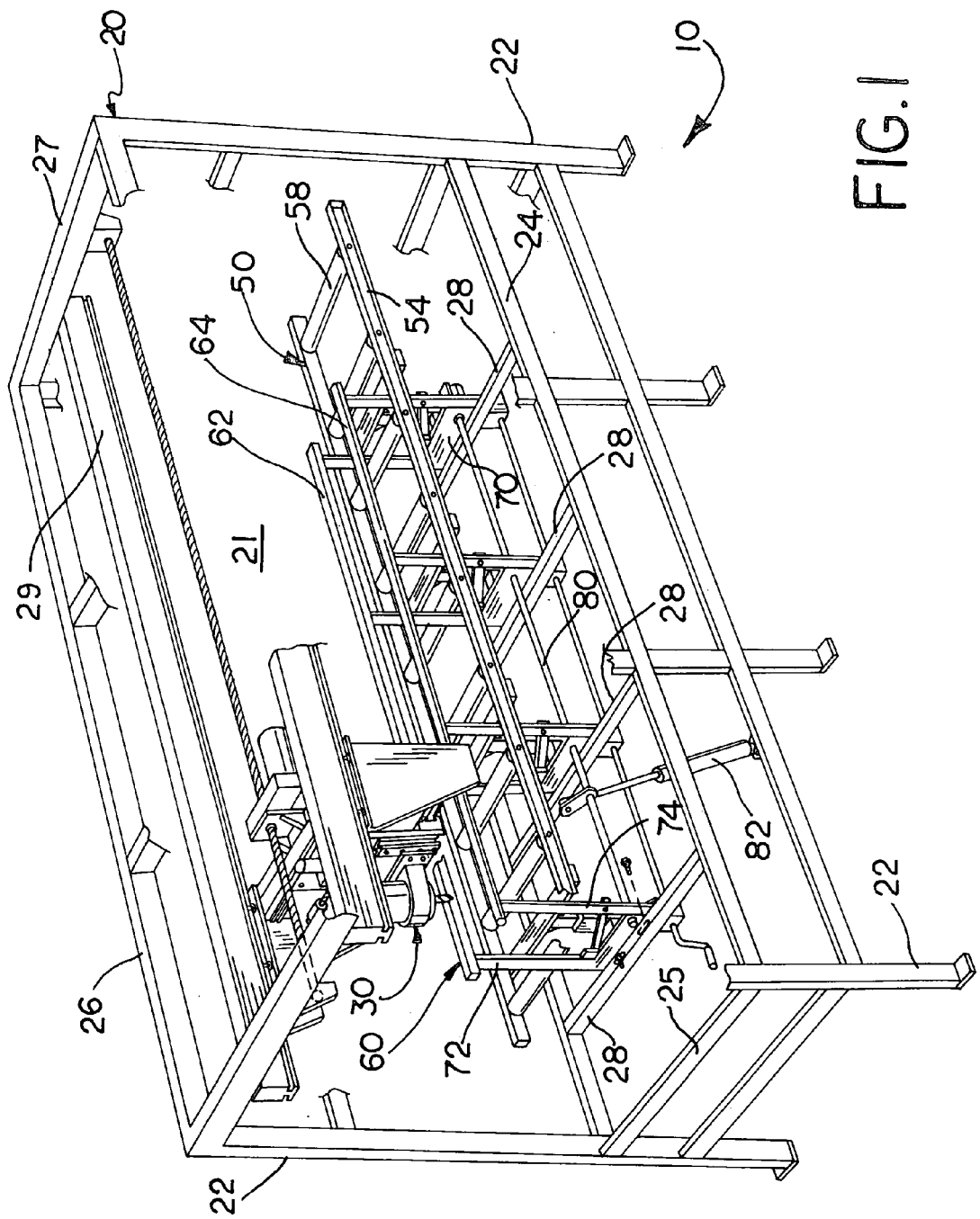
FIG. 1 is a fragmented perspective view of a machine for processing an elongated workpiece, such as polyvinyl tubing, which incorporates the teachings of the present invention.

Referring now to the drawings, the present invention is embodied in a machine, designated generally as reference numeral 10, for cutting openings in the sidewalls of an elongated workpiece 2. Machine 10 is intended to process, i.e., route, cut, drill, mill or otherwise machine, lengths of polyvinyl tubing, but may be adapted for processing an elongated workpiece of varying composition. While described herein and illustrated in the drawings with an automated router tool, machine 10 may use any conventional machine tool mechanism, such as a saw, mill, or drill within the scope of this invention. Machine 10 includes three basic component parts or assemblies: a fixed support frame 20; an automated router assembly 30; an adjustable conveyer table 50; and a clamping mechanism 60.

Figure 2:
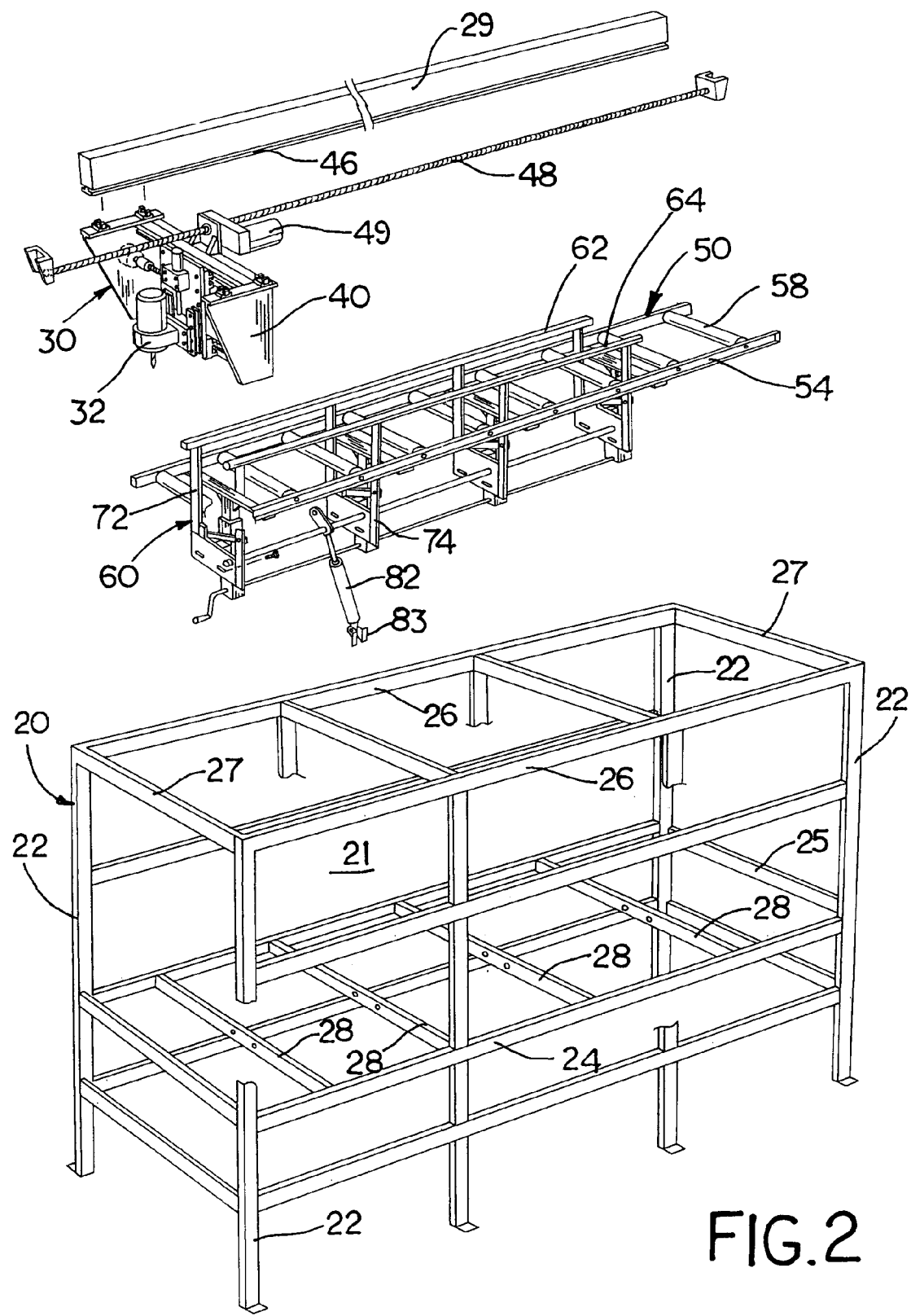
FIG. 2 is a partial exploded view of the machine illustrated in FIG. 1.

As best illustrated in FIGS. 1 and 2, machine 10 is built on fixed frame 20, which supports router assembly 30, conveyer table 50 and clamping mechanism 60. The configuration of frame 20 provides a longitudinal processing bay 21 within which a workpiece is processed and large bay openings at each end of machine 10 through which a workpiece may be inserted and removed. The basic construction of frame 20 is provided by four corner uprights 22 connected by intermediate and upper side members 24 and 26, and intermediate and upper end members 25 and 27. A plurality (four) of cross members 28 traverse between intermediate side members 24. Upper end members 27 support a pair of parallel rail beams 29, which run longitudinally the length of frame 20. As shown, frame 20 also includes various other uprights, side and cross braces to provide sufficient structural integrity to machine 10.

Figure 3:
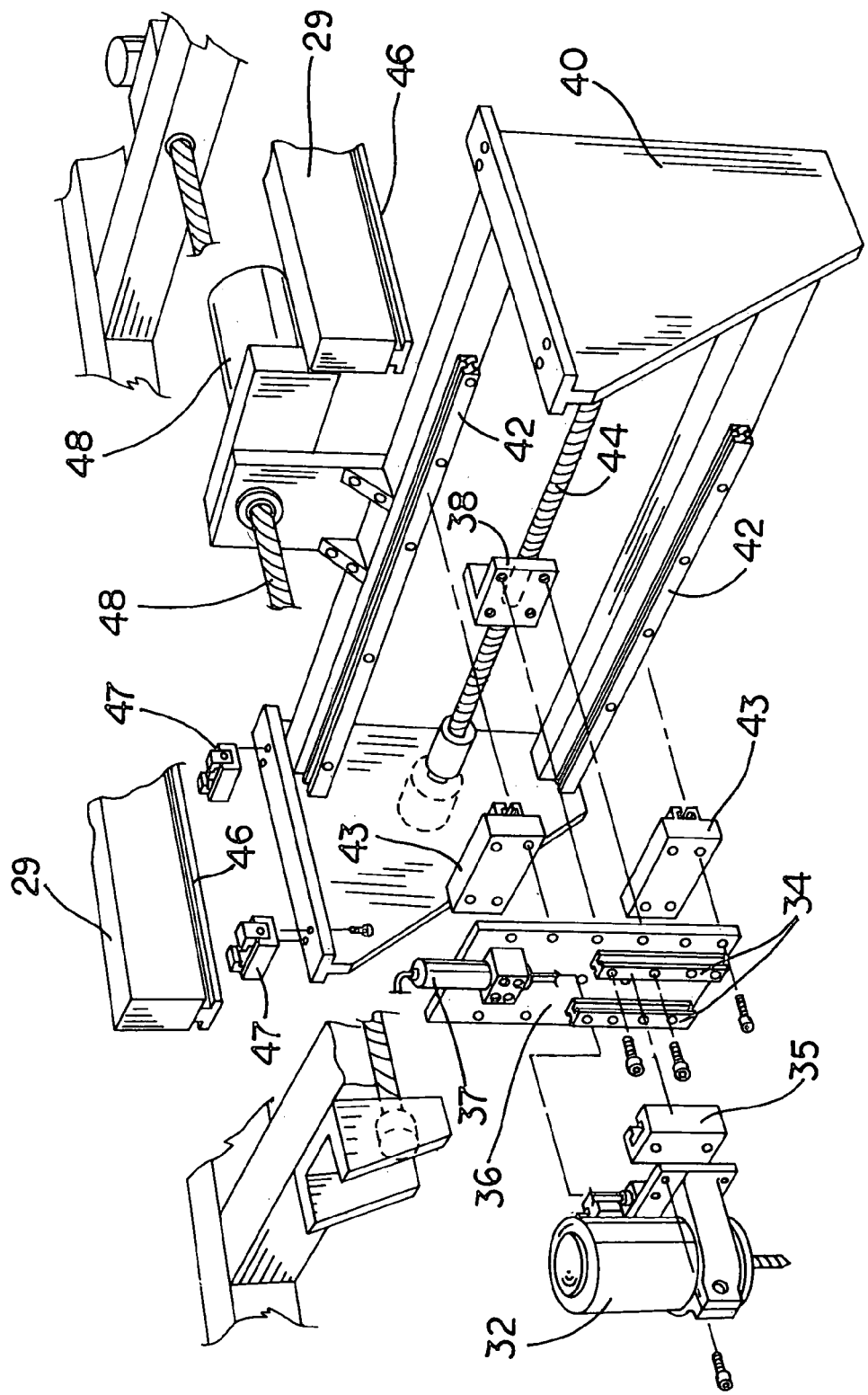
FIG. 3 is an exploded view of the router assembly of the machine illustrated in FIG. 1.

Router assembly 30 is suspended from the top of frame 20 above conveyer table 50 and clamp mechanism 60. Ideally, the operation of router assembly 30 is controlled by an automated process controller (not shown), such as a computer numerical control (CNC) controller or similar electronic or computer process controller. CNC process controllers and other electronic and computer process controllers are well known in the machine tool industry and commonly used to control the operation of tooling machines, such as machine 10. As best shown in FIG. 3, router assembly 30 includes a router head 32, which moves on three axis relative to conveyer table 50. Router head 32 is slidably mounted to a pair of vertical tracks 34 fixed to a head plate 36 for vertical movement relative to conveyer table 50. Router head 32 rides on glides 35 slidably seated on tracks 34. A pneumatic cylinder 37 moves router head 32 up and down tracks 34. Head plate 36 is slidably mounted to a pair of lateral tracks 42 fixed to a router carriage 40. Head plate 36 rides on glides 43 slidably seated on tracks 42. A screw shaft 44 moves head plate 36 laterally relative to conveyer table 50. Screw shaft 44 is rotatably mounted between the ends of router carriage 40 and turned by a reversible control motor (not shown). Drive screw 44 extends operatively through a drive bracket 38, which is secured to the back of head plate 36. Router carriage 40 is slidably mounted to a pair of longitudinal tracks 46 suspended from rail beams 29. Router carriage 40 rides on glides 47 slidably seated on tracks 46. A longitudinal screw shaft 48 is suspended from frame 20. Router carriage 40 is propelled longitudinally along tracks 46 by a carriage drive 49 mounted to the carriage and operably journaled about screw shaft 48. Router assembly 30 includes a flexible wiring harness (not shown), which provides the necessary electrical connection from router head 32 and the various drive and control motors to the process controller.

Figure 7:
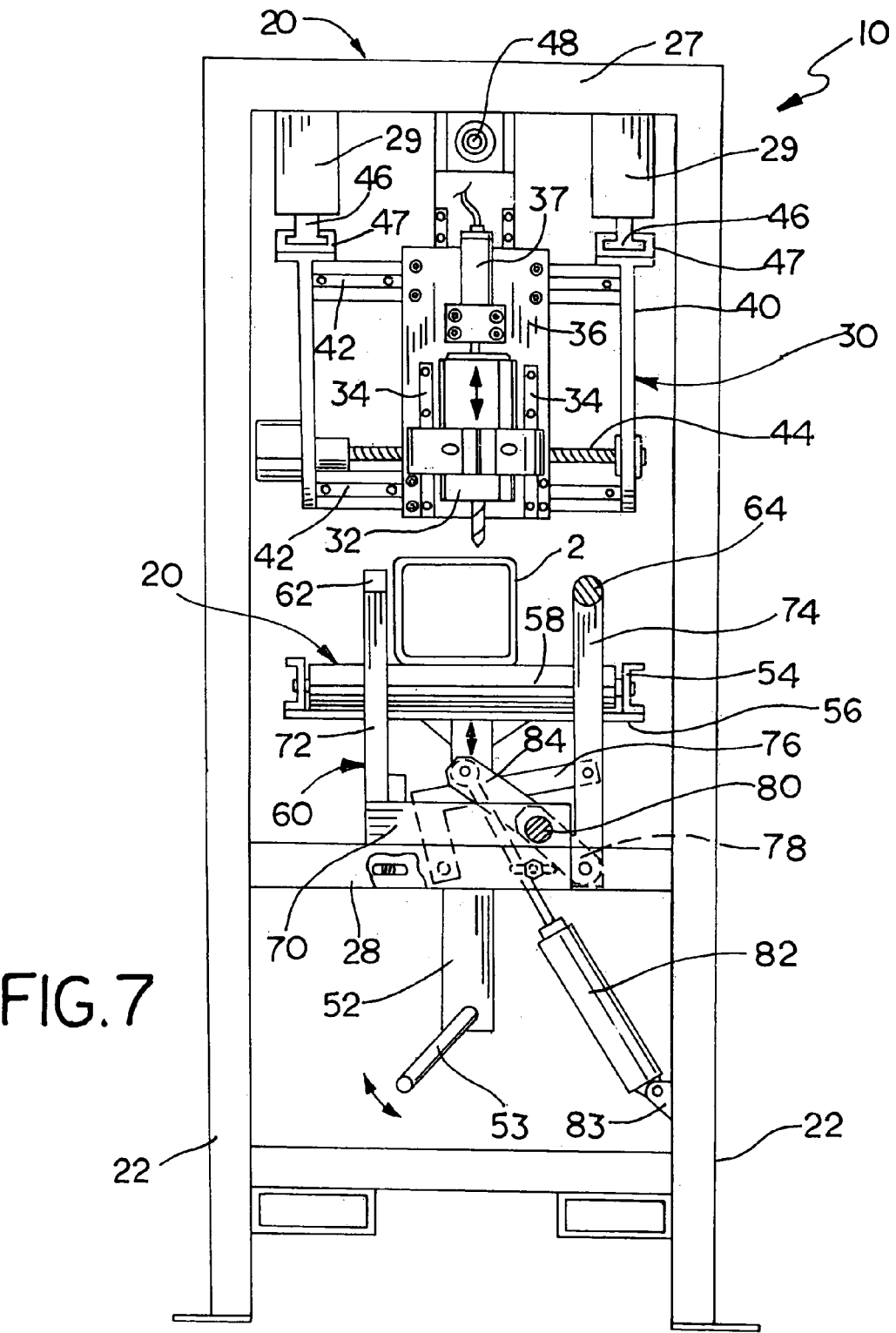
FIG. 7 is an end view of the machine illustrated in FIG. 1 showing the clamp mechanism in the open position with a workpiece supported atop the conveyer table.

As best shown in FIG. 2, conveyer table 50 and clamp mechanism 60 are designed as an integral unit mounted to frame 20 within process bay 21. Conveyer table 50 and clamp mechanism 60 are integrally built on four mounting brackets 70, which are bolted to cross members 28 of frame 20. Conveyer table 50 is supported within process bay 21 atop four elevator jacks 52, which are mounted to mounting brackets 70 and extend longitudinally the entire length of frame 20. Conveyer table 50 includes two longitudinal side members 54 and a number of cross braces 56, which are mounted to the extensible shaft of jacks 52. A plurality of rollers 58 are journaled between side members 54 for rotation relative thereto and provide the platform or table upon which a workpiece (designated as reference numeral 2 in FIGS. 7, 8, and 11) is supported within process bay 21. Jacks 52 allow conveyer table 50 to be raised and lowered within process bay 21 relative to router assembly 30 so as to accommodate workpieces of various dimensions. Jacks 52 may be actuated manually by a crank 53, as shown, or actuated by conventional electrical, mechanical or pneumatic controls.

Figure 4:
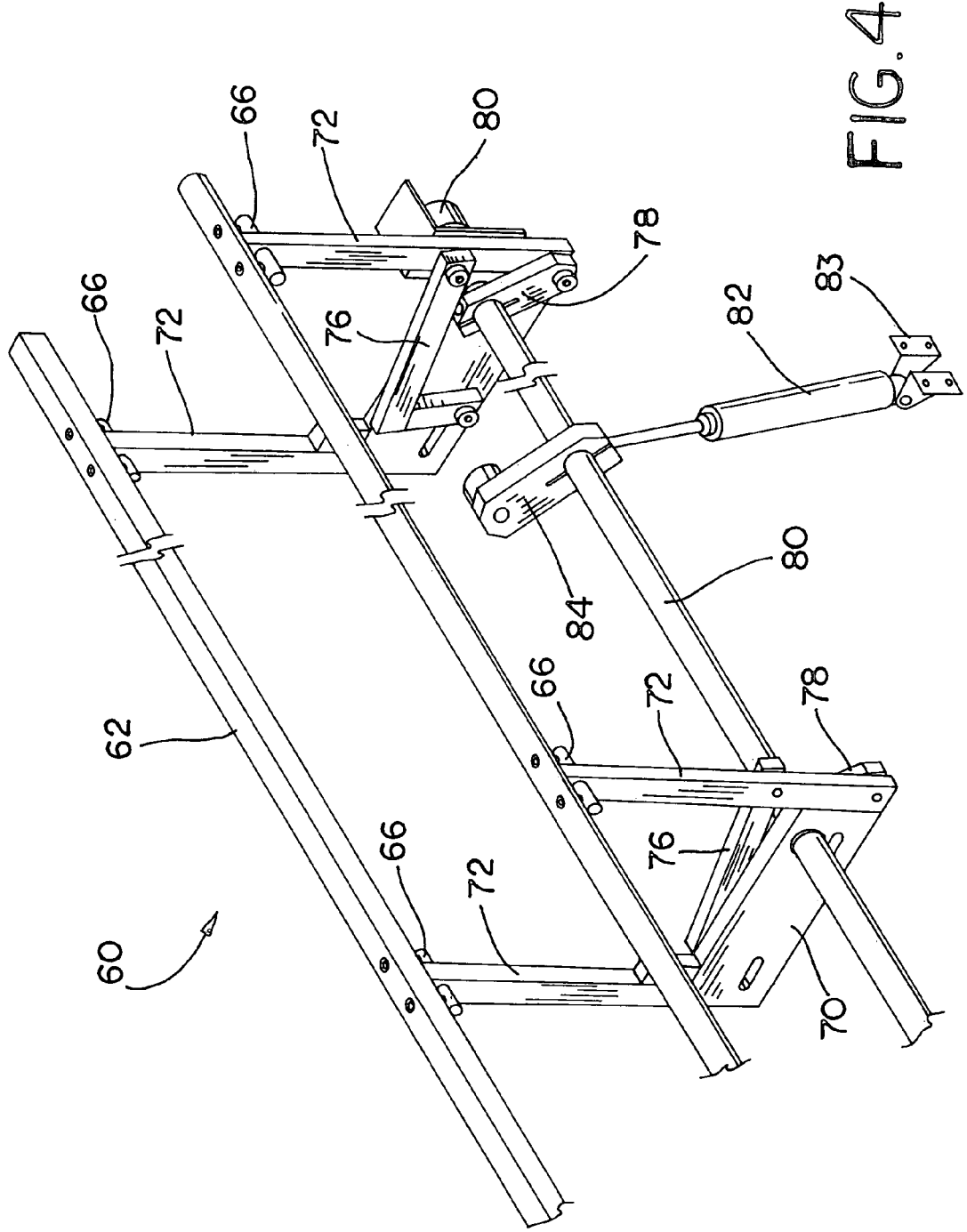
FIG. 4 is perspective view of the clamping mechanism of the machine illustrated in FIG. 1.
Figure 5:
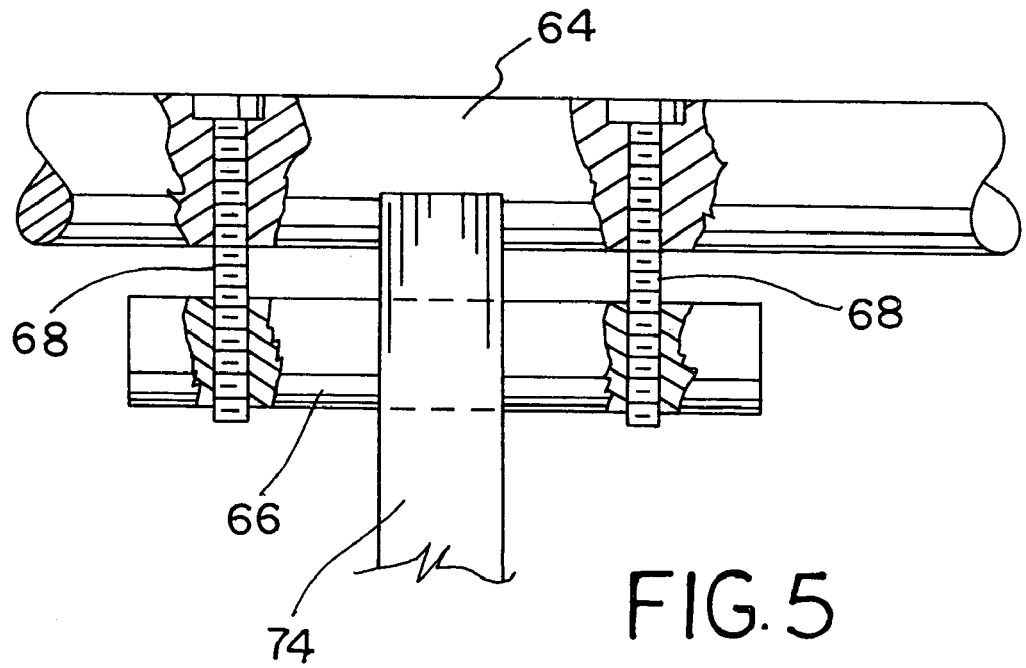
FIGS. 5 and 6 are fragmented side views showing a position pin connecting the moving clamp rail and a linkage arm.
Figure 6:
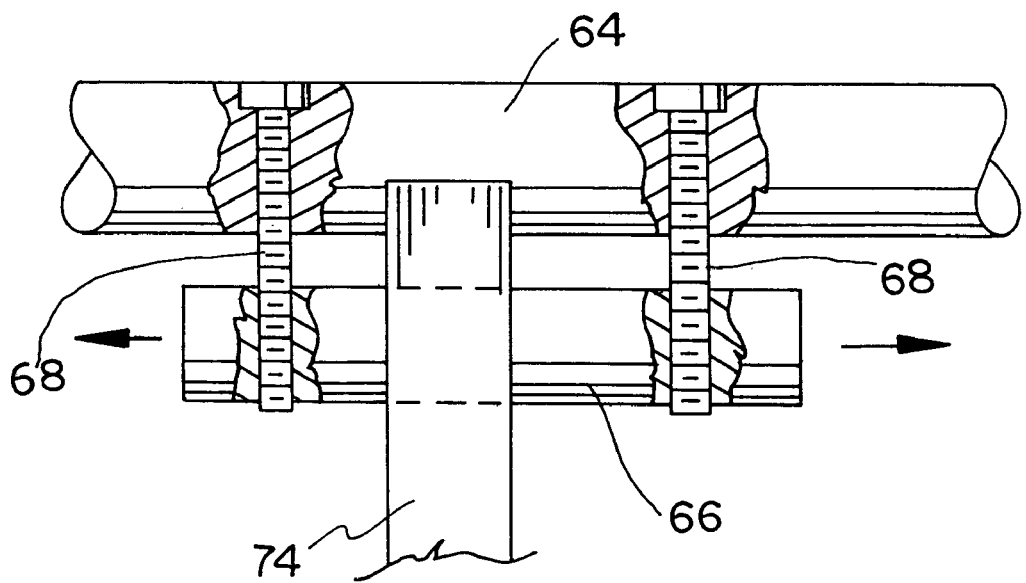

As best shown in FIG. 4, clamp mechanism 60 includes two longitudinal clamp rails: a fixed rail 62 and a moving rail 64. Fixed rail 62 is constructed of a length of rigid square metal tubing, while moving rail 64 is constructed of a length of round metal tubing. Fixed rail 62 is mounted to fixed uprights 72 that extend from each mounting bracket 70. Moving rail 64 is mounted to arms 74 that are pivotally connected to each mounting bracket 70 by two linkage members 76 and 78. Rail 62 and 64 are secured to uprights 72 and arms 74 respectively by a positioning pin 66 and a pair of bolts 68. Bolts 68 extend through bores in rails 62 and 64 and turn into threaded lateral bores in position pins 66. As shown in FIGS. 5 and 6, position pins 66 extend laterally through bores in uprights 72 and arms 74, which allows the pins and the rails to slide laterally so as to properly seat the clamp members atop the uprights or arms. This connection mechanism allows rails 62 and 64 to be properly positioned within process bay 21 and aligned with conveyer table 50 and router assembly 30. Fixed rail 62 also has a stop pin 63 (FIG. 4).

Clamp mechanism 60 also includes a long drive shaft 80. Drive shaft 80 is journaled through bearings blocks seated in openings in mounting brackets 70 and extends longitudinally beneath conveyer table 50. One end of each linkage member 78 is fixed to shaft 80 and the other end is pivotally connected to the bottom of arm 74. Linkage member 76 has an L-shaped configuration. One leg of linkage member 76 is pivotally connected to mounting bracket 70 and the other leg is pivotally connected to a midpoint along arm 74 above linkage member 78.

Uprights 72 and arms 74 extend through gaps between roller 58 and support rails 62 and 64 above conveyer table 50 at generally the same height above conveyer table 50. Linkage members 76 and 78, which pivotally connect arms 74 to mounting bracket 70 below conveyer table 50, allow moving rails to traverse over conveyer table 50 toward and away from fixed rail 62. Arms 74 and linkage members 76 and 78 move within a vertical plane perpendicular to drive shaft 80 and conveyer table 50.

Figure 8:
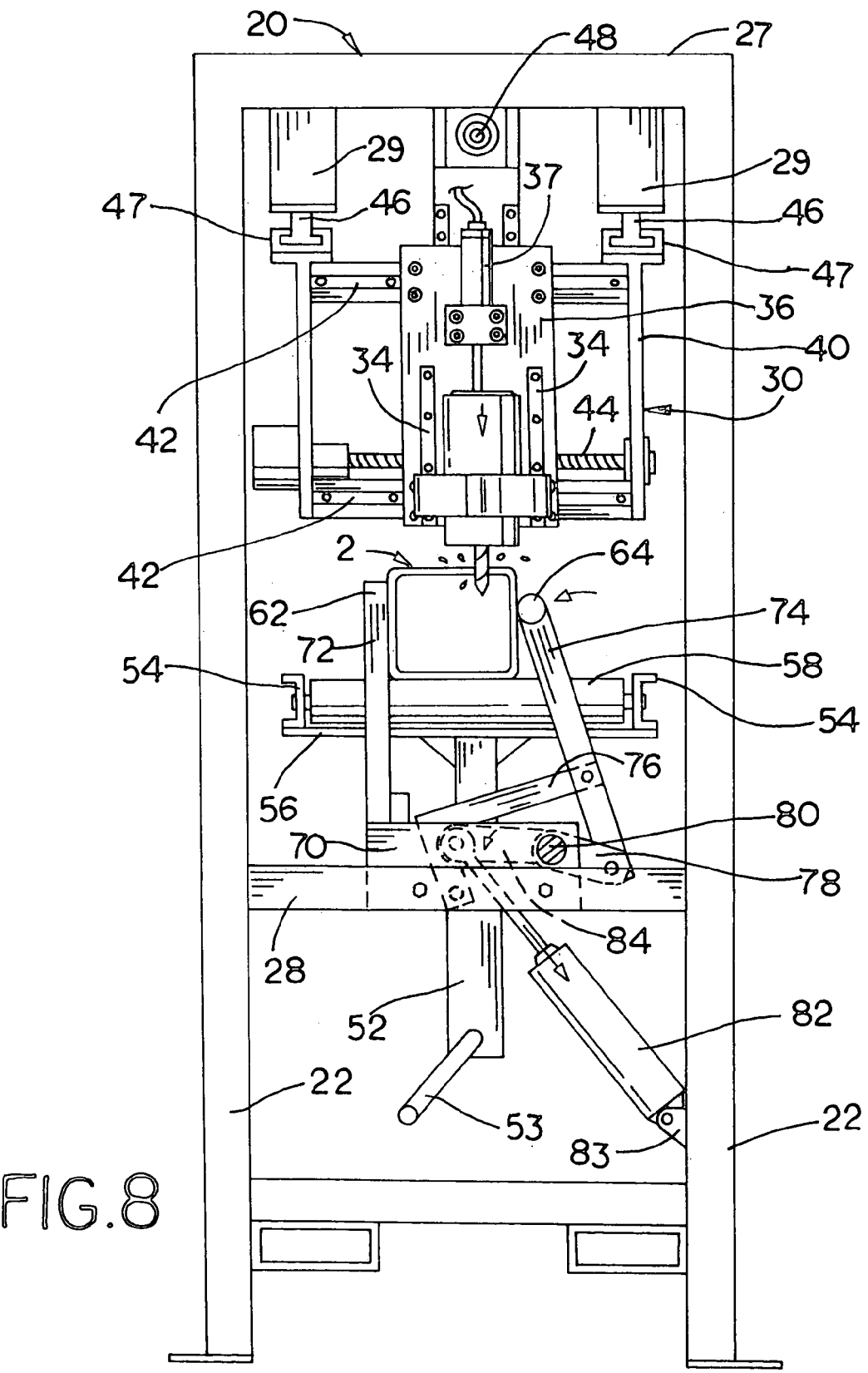
FIG. 8 is an end view of the machine illustrated in FIG. 1 showing the clamp mechanism in the closed position securing a workpiece atop the conveyer table.

Clamping mechanism 60 is actuated by a pneumatic cylinder 82 and drive arm 84. Cylinder 82 is mounted to frame 20 by bracket 83. One end of drive arm 84 is fixed to shaft 80 and the other to the extensible piston of cylinder 82. Cylinder 82 is connected to the process controller (not shown), which controls the operation of clamp mechanism 60, as well as, router assembly 30. Actuating cylinder 82 rotates drive shaft 80 to shift moving rail 64 between an open position (FIG. 7) and a closed "clamping" position (FIG. 8).

The geometrical configuration of the pivotal connection between arms 74 and mounting brackets 70 and linkage members 76 and 78 allows moving rail 64 to traverse over conveyer table 50 at substantially the same height above the conveyer table as fixed rail 62. As drive shaft 80 turns, linkage members 78 pivot to raise or lower the lower end of arms 74 while linkage member 76 pulls or pushes the upper end of arms 74 downward. However, because arms 74 are pivotally connected to linkage members 76 and 78, moving rail 64 follows a curved path defined by a third order polynomial (expressed generally as: $f(x)=Ax^3+Bx^2+Cx+D$, where A, B, C, D are constants), which is derived from the geometric configuration of the linkage connection. As such, the dimension of arms 74 and linkage members 76 and 78, and the relative geometric locations of the pivot points and inter operative relation thereof are selected so that the path of moving rail 64 is as flat as possible between the open and closed positions. This ensures that clamp mechanism 60 can properly secure workpieces of various cross sectional dimensions. It also ensures that the clamping mechanism applies the clamping force in the plane in which the longitudinal axis of both rails lie.

In operation, a workpiece 2 is loaded into process bay 21 atop conveyer table 50 from the open end of the machine. With clamping mechanism in the open position (FIG. 7), workpiece 2 is pushed to the end of conveyer table 50 until it contacts stop 63. With workpiece 2 fully inserted, the process controller (not shown) closes clamp mechanism 60 (FIG. 8) to secure workpiece 2 atop conveyer table 50. Once workpiece 2 is secured atop conveyer table 50, the process controller (not shown) actuates router assembly 30 to begins the tooling process of workpiece 2. Once the tooling process is completed, the process controller returns router assembly 30 to an initial "home" position, and opens clamp mechanism 60 so that the finished workpiece can be removed from process bay 21 and a new workpiece can be loaded.

The automated process controller (not shown) that controls the operation of router assembly 30 requires that the router head be oriented initially, known as "homing" in relation to location and alignment of the workpiece atop conveyer table 50. Once router assembly 30 is "homed," clamping mechanism 60 can be oriented or "zeroed" to calculate and index the clamping operation so that the clamping operation can be uniformly repeated for each successive workpiece of equal dimensions.

This invention as embodied by machine 10 includes a unique apparatus for "homing" and "zeroing" the process controllers and router assembly 30, which automatically compensates for any mechanical wear or play in the linkage and ensures that the workpiece is properly centered and aligned atop the conveyer table. Fixed rail 62 of clamping mechanism 60 allows a fixed reference from which router assembly 30 can be homed and clamping mechanism 60 can be "zeroed." Because workpiece 2 is always aligned against fixed rail 62, the process controller can quickly calculate the proper starting position to router head 32 with respect to the workpiece secured by clamping mechanism 60.

Figure 10:
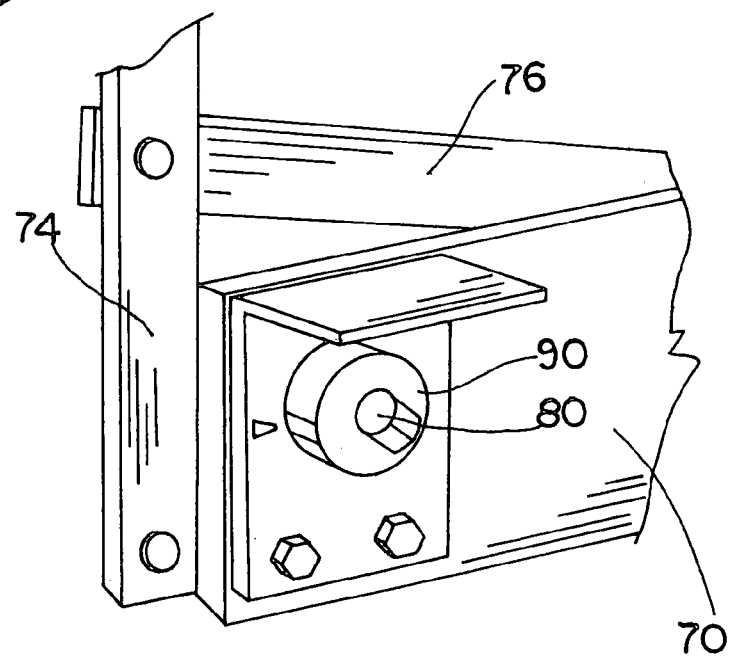
FIG. 10 is a partial perspective view of the encoder mounted to the drive shaft of the clamping mechanism.

To facilitate this "zeroing," clamp mechanism 60 includes a digital encoder 90, or similar device, operatively mounted to drive shaft 80 (FIG. 10). Digital encoders are well known in the art. Encoder 90 is used to generated an electrical signal that represents a relational value of the rotational displacement of drive shaft 80. The information signal generated from encoder 90 is used by the process controller to calculate the relative position of moving rail 64 with respect to fixed rail 62. The process controller then uses the encoder information to properly position router assembly 30 in relation to the given workpiece secured by clamping mechanism 60. The encoder can be electronically or manually calibrated or "zeroed" so that a "zero" value is generated when moving rail 64 engages workpiece 2 or fixed rail 62 at a given contact force. From this initial "zero" value, the process controller can consistently and accurately position router assembly 30 regardless of wear or play in the linkage of clamping mechanism 60.

Figure 9:
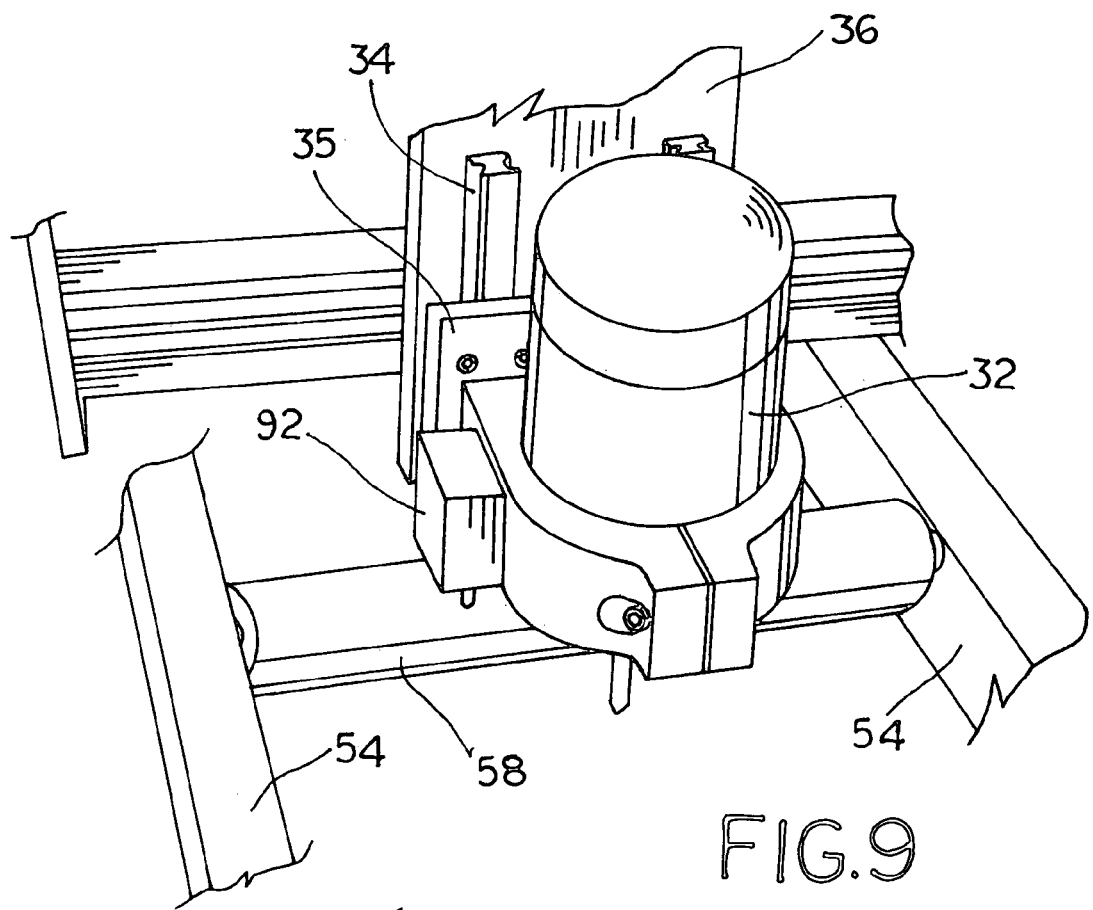
FIG. 9 is a partial perspective view of the router head illustrating a laser locator.
Figure 11:
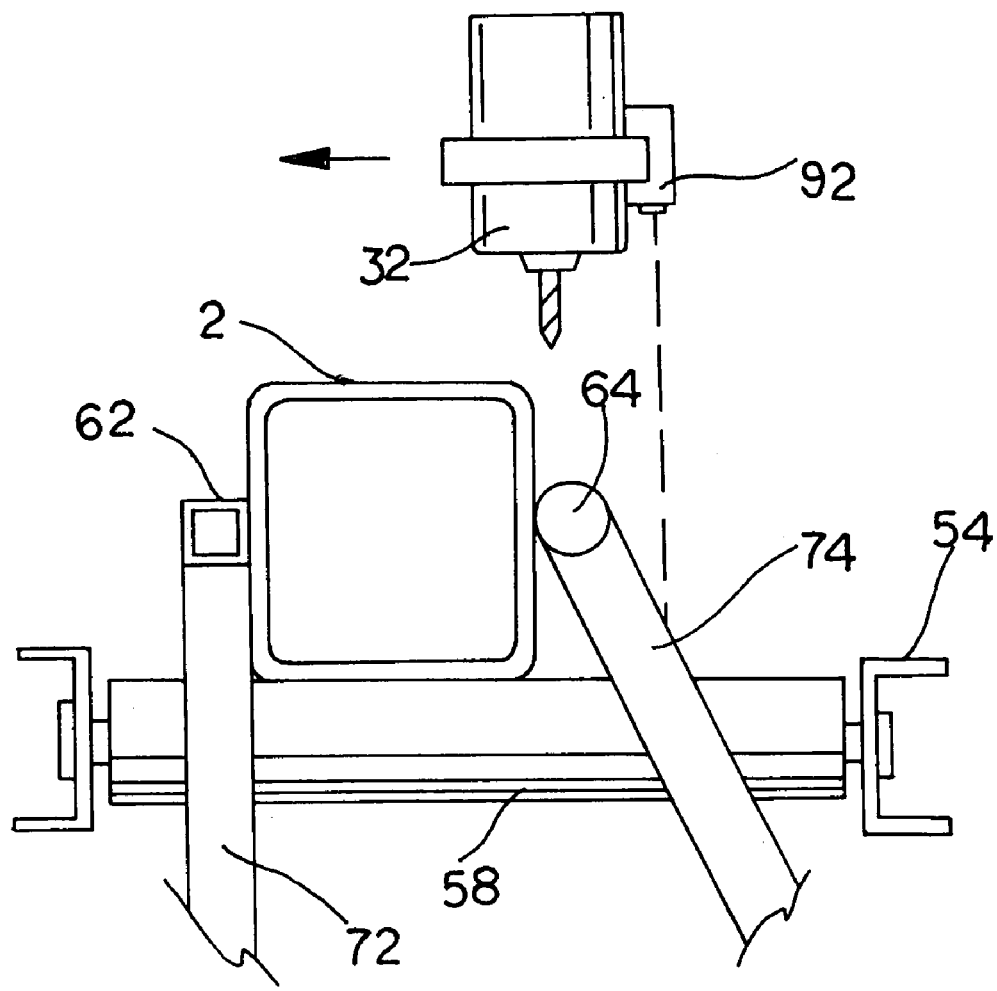
FIG. 11 is a partial end view of the machine illustrated in FIG. 1 showing the operation of the laser locator.

In addition, a laser locating device 92 is mounted to router head 32 (FIGS. 9 and 11). Locator 92 produces a laser beam that when obstructed products a contact signal, which triggers a second "zero" value, which can be used by the process controller to initialize or "home" router assembly 30. To initialize or "home" router assembly 30, the process controller moves router head 32 traversely over conveyer table 50 until the laser beam is obstructed by the edge of moving rail 64 at which point locator 92 generates a contact signal to the process controller. From this contact signal, the process controller calculates the lateral position of router head 32 based on the known dimension of moving rail 64 and the dimension of workpiece 2. Again, the contact signal is generated with respect to the actual location of moving rail 64 which abuts against fixed rail 62 and/or the given workpiece, the "homing" process is unaffected by wear or play in clamping mechanism.

ADVANTAGES

The present invention as embodied in machine 10 provides several advantages and improvements. The arms upon which the moving rail are mounted are rigid and act as long levers to provide increased clamping force to the workpiece. Since the linkage of the clamping system is mounted below the conveyer table, the process bay remains uncluttered, which makes the machine safer and easier to maintain. The simply linkage of the clamping mechanism is easy to access and maintain. Machine is easier to initially setup. The conveyer table and clamping systems are both built on the same mounting brackets as an integral unit, which makes the initial alignment of the conveyer table, clamping mechanism and router assembly. The use of position pins to mount the rails to the uprights and arms greatly reduces assembly time. The position pins allow the rails to be mounted without taping new bores when the arm are misaligned to variations in the frame cross members. The laser locator mounted to the router head and the encoder mounted to the drive shaft of the clamping mechanism allow the process controller to readily "home" the router assembly and "zero" the clamping mechanism.

The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

What is claimed is:

1. A clamping mechanism for securely holding an elongated workpiece for processing by a tooling machine comprising:
   a frame;
   a longitudinally extending conveyer table mounted to the frame for moving and supporting the workpiece;
   a first longitudinally extending clamping rail;
   a pair of uprights mounted to the frame below the conveyer table for supporting the first clamping rail above the conveyer table;
   a second longitudinally extending clamping rail;
   a pair of arms for supporting the second clamping rail above the conveyer table for traverse movement over the conveyer table toward and away from the first clamping rail;
   linkage means connecting the pair of arms to the frame beneath the conveyer table for shifting the pair of arms to move the second clamping rail over the conveyer table between an open position where the second clamping rail is spaced from the workpiece and a closed position where the second clamping rail engages the workpiece and forces the workpiece against the first clamping rail, the linkage means shifting the pair of arms such that the second clamping rail traverses over the conveyer table along a path substantially parallel in relation to the conveyer table between the one position and closed position, the linkage means includes a first linkage member and a second linkage member, the first linkage member is pivotally connected to the frame and one of the pair of arms, the second linkage member is pivotally connected to the frame and the one of the pair of arms between the second clamping rail and the location where the first linkage member is connected to the one of the pairs of arms; and means for actuating the linkage means.

2. The clamping mechanism of claim 1 wherein the linkage means also includes a longitudinal drive shaft operatively connected to the first linkage member, so that rotation of the drive shaft pivots the first linkage member.

3. The clamping mechanism of claim 2 wherein the linkage means includes an encoder for generating an electrical signal corresponding to the rotational movement of the drive shaft as the second clamping rail moves between the open position and the closed position.

4. The clamping mechanism of claim 2 wherein the actuating means includes an actuator for rotating the drive shaft.

5. The clamping mechanism of claim 1 and adjustment means for securing the first clamping rail to the pair of uprights so as to allow selective adjustment of the position of the first clamping rail relative to the pair of uprights.

6. The clamping mechanism of claim 1 and adjustment means for securing the second clamping rail to the pair of arms of uprights so as to allow selective adjustment of the location of the second clamping rail relative to the pair of arms.

7. The clamping mechanism of claim 1 and a conveyer table adjustment means adapted for mounting the conveyer table to the frame for selectively moving the conveyer table toward and away from the first clamping rail and second clamping rail.

8. The clamping mechanism of claim 1 wherein the linkage means includes a mounting bracket adapted for connecting the first linkage member and the second linkage member to the frame.

9. The clamping mechanism of claim 8 and a conveyer table adjustment means fixed to the mounting bracket for selectively moving the conveyer table toward and away from the first clamping rail and second clamping rail.

10. The clamping mechanism of claim 1 wherein the linkage means shifts the pair of arms perpendicularly relative to the direction that the conveyer table moves the workpiece.

11. The clamping mechanism of claim 1 wherein the conveyer table has gaps through which the plurality of uprights and the plurality of arms extend.

12. A tooling machine for processing an elongated workpiece comprising:

a frame;

a longitudinally extending conveyer table mounted to the frame for moving and supporting the workpiece;

a clamping mechanism for securely holding an elongated workpiece atop the conveyer table, the clamping mechanism including a first longitudinally extending clamping rail, a pair of uprights mounted to the frame below the conveyer table for supporting the first clamping rail above the conveyer table, a second longitudinally extending clamping rail, a pair of arms for supporting the second clamping rail above the conveyer table for traverse movement over the conveyer table toward and away from the first clamping rail, linkage means connecting the pair of arms to the frame beneath the conveyer table for shifting the pair of arms to move the second clamping rail over the conveyer table between an open position where the second clamping rail is spaced from the workpiece and a closed position where the second clamping rail engages the workpiece and forces the workpiece against the first clamping rail, the linkage means shifting the pair of arms such that the second clamping rail traverses over the conveyer table along a path substantially parallel in relation to the conveyer table between the open position and closed position, the linkage means includes a first linkage member and a second linkage member, the first linkage member is pivotally connected to the frame and one of the pair of arms, the second linkage member is pivotally connected to the frame and the one of the pair of arms between the second clamping rail and the location where the first linkage member is connected to the one of the pairs of arms, and means for actuating the linkage means; and a tool assembly mounted to the frame and suspended over the conveyer table for processing the workpiece supported by the conveyer table.

13. The tooling machine of claim 12 wherein the linkage means also includes a longitudinal drive shaft operatively connected to the first linkage member, so that rotation of the drive shaft pivots the first linkage member.

14. The tooling machine of claim 13 wherein the linkage means includes an encoder for generating an electrical signal corresponding to the rotational movement of the drive shaft as the second clamping rail moves between the open position and the closed position.

15. The tooling machine of claim 13 wherein the actuating means includes an actuator for rotating the drive shaft.

16. The tooling machine of claim 12 and adjustment means for securing the first clamping rail to the pair of uprights and the second clamping rail to the pair of arms so as to allow selective adjustment of the position of the first clamping rail relative to the pair of uprights and the second clamping rail relative to the pair of arms.

17. The tooling machine of claim 12 and a conveyer table adjustment means adapted for mounting the conveyer table to the frame for selectively moving the conveyer table toward and away from the first clamping rail and second clamping rail.

18. The tooling machine of claim 12 wherein the linkage means includes a mounting bracket adapted for connecting the first linkage member and the second linkage member to the frame.

19. The tooling machine of claim 18 and a conveyer table adjustment means fixed to the mounting bracket for selectively moving the conveyer table toward and away from the first clamping rail and second clamping rail.

20. The tooling machine of claim 12 wherein the conveyer table has gaps through which the plurality of uprights and the plurality of arms extend.

* * * * *